United States Patent Office 3,541,102
Patented Nov. 17, 1970

---

3,541,102
POLYFLUOROVINYL PYRIDINES
Everett A. Mailey, Norristown, Pa., assignor to Pennwalt Corporation, Philadelphia, Pa., a corporation of Pennsylvania
No Drawing. Filed Dec. 22, 1967, Ser. No. 692,681
Int. Cl. C07d *31/24*
U.S. Cl. 260—290          7 Claims

ABSTRACT OF THE DISCLOSURE 2-(polyfluorovinyl)pyridines of the structure

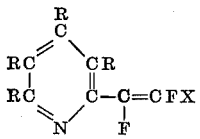

where the R substituents are, for example, hydrogen, alkyl and haloalkyl, and X is fluorine, alkyl and haloalkyl, are prepared by contacting a 2-(polyfluoroethyl)-pyridine of the formula

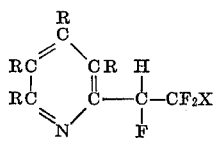

at 400° C. to 750° C. with an alkali metal fluoride.

---

This invention relates to 2-(polyfluorovinyl)pyridines and the method of preparing same.

S. Dixon, U.S. 2,874,166, treated an ether solution of 2-pyridyl lithium at −70° C. with an excess of chlorotrifluoroethylene. The product was 2-(2-chloro-1,2-difluorovinyl)pyridine. P. E. Brumfield et al., Quarterly Progress Report, September 1960, Contract No. AF 33(616)–7021, Project No. 7371, attempted to prepare 2-(trifluorovinyl)-pyridine by an analogous reaction wherein 2-pyridyl lithium was reacted with an excess of tetrafluoroethylene at −40° C. and −60° C. The only product isolated was a bipyridyl compound, 1,2-difluoro-1,2-di(2-pyridyl)ethylene, i.e. having the structure

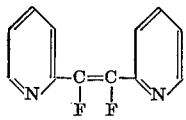

In accordance with the present invention a novel class of 2-(polyfluorovinyl)pyridines are provided having the structure

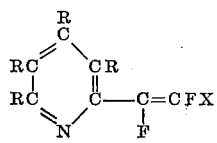

where the R substituents are independently selected from the group consisting of hydrogen, fluorine, chlorine, bromine, phenyl, pyridyl, alkyl having one to eight carbon atoms, alkoxy having one to eight carbon atoms, haloalkyl and polyhaloalkyl having one to eight carbon atoms where the halogen substituents are fluorine, chlorine and bromine; and X is selected from the group consisting of fluorine, alkyl, haloalkyl and polyhaloalkyl having one to eight carbon atoms where the halogen substituents are fluorine, chlorine and bromine. The preferred compounds of this invention are 2-(1,2,2-trifluorovinyl)pyridine,
6-(1,2,2-trifluorovinyl)-2-picoline,
2- and 6-(1,2,2-trifluorovinyl)-3-picoline and
2-)1,2,2-trifluorovinyl)-4-picoline.

The 2-(polyfluorovinyl)pyridines embodied herein are prepared by contacting a 2-(polyfluoroethyl)pyridine of the formula

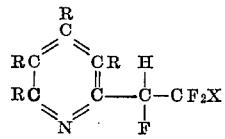

where R and X are as defined above, with a particulate or granular alkali metal fluoride, e.g. NaF, KF, CsF and LiF, or a mixture of alkali metal fluoride and particulate aluminum oxide, at a temperature within the range of about 400° C. to about 750° C., preferably from about 575 to 675° C. The 2-(polyfluoroethyl)pyridine feed material is obtained by reacting a pyridine N-oxide with a substituted fluoroethylene as described in the copending application of Everett A. Mailey and Luke R. Ocone, Ser. No. 619,911, filed Mar. 2, 1967.

The method of this invention is conveniently carried out by passing the gaseous 2-(polyfluoroethyl)pyridine through a catalyst bed of the particulate alkali metal fluoride (and alumina, if desired, desirably in a tubular column equipped with suitable heating means such as a Marshall furnace. The reaction is advantageously carried out at sub-atmospheric pressures, preferably within the range of about 0.05 mm. to 10 mm. Hg using, in general, space velocities of the order of about one to about twelve parts by weight of feed per part of catalyst per hour. The products of the reaction are separated from the feed material by vapor phase chromatographic techniques.

The 2-(polyfluorovinyl)pyridines of this invention are useful in several areas of polymer technology. For instance, the fluorovinylpyridine may be polymerized in a conventional manner in the presence of a small amount of a free radical forming catalyst (e.g. an organic peroxide) to yield a polymer which is useful as an adhesive. The polymerization may be carried out in a solvent such as perfluorodimethylcyclobutane, tertiary butylalcohol, or acetonitrile, at about 0 to 75° C., or the fluorovinylpyridine may be polymerized in situ between the surfaces of two or more substrates for which lamination is desired by moderately elevating the temperature of the monomer to about 50 to 200° C. with an organic peroxide catalyst such as benzoyl peroxide. Another important use of the fluorovinylpyridines of this invention is in the modification of tetrafluoroethylene polymers. Polytetrafluoroethylene is non-receptive to the conventional dyes and pigments used for coloring plastics because of its very inert nature. However, by copolymerizing a minor amount, e.g., from about 0.01 to about 10% of the fluorovinylpyridine with tetrafluoroethylene monomer using the normal polymerization techniques for preparing tetrafluoroethylene polymers, a polymer is produced which has good receptivity to dyes and pigments. The simplest analogue, trifluorovinylpyridine, is preferred as the comonomer in this utility.

The following examples are offered to clarify and illustrate the invention and should not be construed as limitative of the scope thereof.

Fifteen inches of a 23 inch long, one-inch diameter, glass tube was charged with 57 grams of ⅛ inch sodium fluoride tablets, and then a mixture of 111 grams of sodium fluoride tablets with 133 grams of 8–14 mesh particulate activated alumina. The column was electrically heated to 700° C. for 3 hours with about 90 cc./minute of nitrogen passing through and then cooled to reaction temperature. Gaseous 2 - (1,2,2,2 - tetrafluoroethyl)pyridine at a pressure of 0.9–1.0 mm. Hg abs. was passed through the catalyst bed at 446–448° C. with a space velocity therein of about 3.0 grams fluoroethylpyridine per gram catalyst per hour. The conversion of the tetrafluoroethylpyridine to trifluorovinylpyridine was 30%; the product was isolated (by vapor phase chromatographic distillation) from the unconverted tetrafluoroethylpyridine which was then available for recycling. The product was a colorless $n_D^{25°}$ C.=1.4775; B.P.=155° C. Proton and fluorine NMR spectra and infrared spectrum confirmed the structure

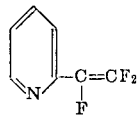

Elemental analysis. Found (percent): C, 53.07; H, 2,81; F, 35.82; N, 8.85;
Calculated for $C_7H_4F_3N$ (percent): C, 52.84; H, 2.53; F, 35.82; N, 8.80.

I claim:
1. A polyfluorovinylpyridine having the structure

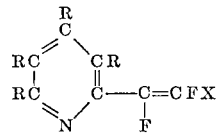

where the R substituents are independently selected from the group consisting of hydrogen, fluorine, chlorine, bromine, and alkyl having one to eight carbon atoms, and X is selected from the group consisting of fluorine, alkyl, haloalkyl and polyhaloalkyl having one to eight carbon atoms where the halogen substituents are selected from the group consisting of fluorine, chlorine, and bromine.

2. A perfluorovinylpyridine according to claim 1 where each R substituent is hydrogen and X is fluorine.

3. A perfluorovinylpyridine according to claim 1 where one R substituent is methyl, the other R substituents are hydrogen, and X is fluorine.

4. The method of preparing the polyfluorovinylpyridine of claim 1 which comprises contacting at a temperature within the range of about 400° C. to about 750° C. a fluoroethylpyridine of the structure

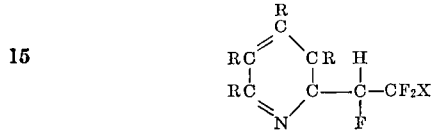

where R and X are as defined in claim 1, with an alkali metal fluoride.

5. The method of claim 4 wherein each R substituent is hydrogen and X is fluorine.

6. The method of claim 5 wherein the temperature is within the range of about 575 to 675° C.

7. The method of claim 4 wherein aluminum oxide is mixed with the alkali metal fluoride.

References Cited
UNITED STATES PATENTS
2,874,166  3/1959  Dixon _____ 260—290

HENRY R. JILES, Primary Examiner

H. I. MOATZ, Assistant Examiner

U.S. Cl. X.R.
260—896, 884, 30.2